Figure 1:
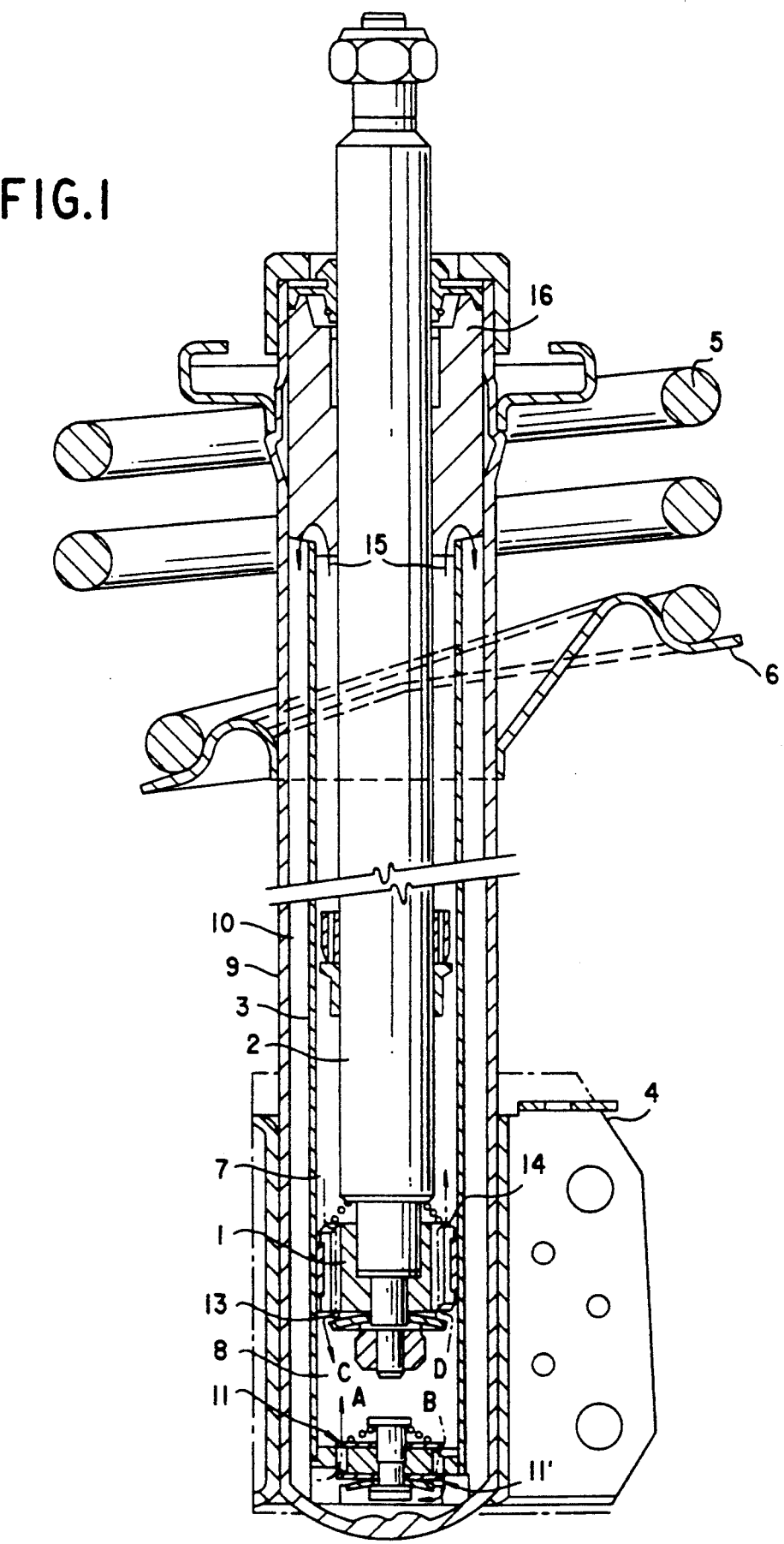

… … … … … … … … … … … … …

United States Patent [19]

Kempf

[11] Patent Number: 5,318,157
[45] Date of Patent: Jun. 7, 1994

[54] PILOT-OPERATED HYDRAULIC SHOCK ABSORBER FOR A MOTOR VEHICLE

[75] Inventor: Christian Kempf, Toulouse, France

[73] Assignee: Siemens Aktiengesellschaft, Munich, Fed. Rep. of Germany

[21] Appl. No.: 934,659

[22] PCT Filed: Jun. 25, 1991

[86] PCT No.: PCT/EP91/01187
§ 371 Date: Dec. 28, 1992
§ 102(e) Date: Dec. 28, 1992

[87] PCT Pub. No.: WO92/00468
PCT Pub. Date: Jan. 9, 1992

[30] Foreign Application Priority Data

Jun. 28, 1990 [FR] France .................. 90 08156

[51] Int. Cl.⁵ ........................................ F16F 9/50
[52] U.S. Cl. ........................ 188/299; 188/322.17; 188/315; 188/318
[58] Field of Search .......... 188/322.17, 322.16, 188/313, 314, 315, 317, 318; 280/707

[56] References Cited

U.S. PATENT DOCUMENTS

| | | |
|---|---|---|
| 3,528,531 | 9/1970 | Schweller et al. ............... 188/88 |
| 3,843,107 | 10/1974 | Atkins ........................... 188/287 X |
| 4,589,528 | 5/1986 | Axthammer et al. ............ 188/279 |
| 4,749,069 | 6/1988 | Knecht et al. .................. 188/299 |
| 5,148,895 | 9/1992 | Kakizaki ........................ 188/299 |

FOREIGN PATENT DOCUMENTS

| | | |
|---|---|---|
| 0302587 | 2/1989 | European Pat. Off. . |
| 3231739 | 3/1984 | Fed. Rep. of Germany . |
| 2588343 | 10/1986 | France . |
| 458895 | 12/1936 | United Kingdom . |
| 1262855 | 2/1972 | United Kingdom . |
| 2164120 | 8/1985 | United Kingdom . |

Primary Examiner—Robert J. Oberleitner
Assistant Examiner—Lee W. Young
Attorney, Agent, or Firm—Herbert L. Lerner; Laurence A. Greenberg

[57] ABSTRACT

The shock absorber comprises a working cylinder (3) in which a piston (1) integral with a rod (2) defines two chambers (7, 8). In accordance with the invention, a rotary solenoid valve is placed in an end piece closing the working cylinder so as to control the circulation of the damping liquid between one chamber (7) and a reservoir (10). The solenoid valve comprises a passage (18, 22, 19) for the liquid between this cheer and this reservoir and closing devices (21, 21', 21", 21''') for the selective throttling of the passage. The closing devices are integral with a rotor (27) mounted on a bearing (33), opposite a stator (26) forming part of a magnetic circuit (25, 26, 27) excited by an electric coil (24). Air gaps extending parallel to the axis of rotation of the rotor (27) are formed between the stator and the rotor. Feeding the coil (24) brings about the rotation of the rotor (27) and the closing devices (21) integral with the latter, in order to cause the throttling of the passage to vary.

11 Claims, 3 Drawing Sheets

PILOT-OPERATED HYDRAULIC SHOCK ABSORBER FOR A MOTOR VEHICLE

The present invention relates to a hydraulic shock absorber for a motor vehicle and, more particularly, to a shock absorber of this type which comprises means making it possible to pilot-operate the damping obtained in accordance with predetermined laws.

A hydraulic shock absorber conventionally comprises a working cylinder and a piston integral with a rod which projects from one end of the cylinder. The piston divides the cylinder into two chambers filled with a damping liquid. The piston and the cylinder are integral with the chassis of a motor vehicle and with a support of a wheel of this vehicle, respectively. Valves are incorporated in the piston and at the bottom of the cylinder in order selectively to put chambers of the cylinder in communication with each other and with an outer damping-liquid reservoir, which is generally disposed concentrically to the working cylinder, the shock absorber then assuming a "twin-tube" structure.

When the vehicle moves, the irregularities of the surface of the road then apply forces to each wheel which are transmitted to the shock absorber and which subject the damping liquid to compressive forces followed by pressure-reducing forces. Suitable calibrations of the valves mounted in the piston and in the bottom of the cylinder make it possible to adjust the level of absorption of these forces by the shock absorber, in accordance with a predetermined, but fixed, damping law.

In order to make it possible to adapt the flexibility (or "firmness") of the suspension of the vehicle, on the one hand, to certain characteristics of the irregularities of the surface of the road encountered by a wheel and, on the other hand, to the flexibility desired by the driver, corresponding for example to a "sporty" or "comfortable" drive, shock absorbers improved by the addition of a solenoid valve are known which make it possible to control the flow rate or the pressure drop of the damping liquid which passes from one chamber of the cylinder into the reservoir, or vice versa, or from one chamber into the other, in conjunction with the displacements of liquid permitted by the above mentioned S valves. It is then possible to adjust, by means of an electronic calculator controlling the solenoid valve, the flexibility of the suspension as a function of various piston, vertical acceleration of the body of the vehicle, speed of the vehicle, etc.—in such a way as to optimise the absorption of the movements of the body of the vehicle as a function of the irregularities of the surface of the road which are encountered by a wheel of the vehicle and/or of the type of flexibility of the suspension selected by the driver.

The document FR-A-2,588,343 discloses such a shock absorber in which the solenoid valve projects laterally from the working cylinder, this shock absorber thereby lacking any compactness. In other structures of known shock absorbers, the solenoid valve is integrated with the piston, with the rod of the piston or with the bottom of the working cylinder, and these structures therefore do not have this disadvantage. On the other hand, they demand major modifications of the Conventional components of the shock absorber, which are costly to implement. These modifications may additionally affect the mechanical strength of the shock absorber, which, consequently, makes it necessary to reinforce the modified components. Thus, for example, when the solenoid valve is incorporated in the rod of the piston, it is necessary to reinforce the diameter of the rod in order to compensate for the recess made in order to accommodate the solenoid valve. Furthermore, this increased diameter reduces the useful volume of the chamber of the cylinder which is traversed by the rod of the piston. In another structure of shock absorber, disclosed in U.S. Pat. No. 3,528,531, a manually rotatable valve is arranged in an end piece closing the upper chamber and traversed by the piston rod. However, such a valve requires to be adjusted that the shock absorber is disconnected from the vehicle to fully extend the rod for engaging cooperating grooves integral with the position with tabs located on rotating part of the valve and to rotate the rod with respect to the shock absorber body in order to select a predetermined position of the valve. This method is not applicable to a shock absorber in which fluid flow needs to be dynamically adjusted in response to road or ride conditions.

The object of the present invention is therefore to produce a pilot-operated hydraulic shock absorber of the type described above, which does not have the disadvantages of the known pilot-operated shock absorbers, with an integrated solenoid valve.

In particular, the object of the present invention is to produce an hydraulic shock absorber with an integrated pilot solenoid valve which is of compact structure, which does not require modifications of the components and parts of such a shock absorber.

The object of the present invention is also to produce a shock absorber of this type in which the integration of a pilot solenoid valve does not substantially reduce the useful stroke of the piston in the working cylinder.

A further object of the present invention is to produce a shock absorber of this type equipped with a solenoid valve which is insensitive to the accelerations to which its constituent components are subjected.

The objects of the invention, as well as others which will emerge from the present description below, are achieved with a pilot-operated hydraulic shock absorber for a motor vehicle, of the type which comprises a working cylinder, a piston provided with a rod which is coaxial with the cylinder and which delimits in the latter two chambers filled with a damping liquid, means for the passage of the liquid between one of the chambers and an outer reservoir and means for adjusting the pressure drop of the liquid in this passage, where the said passage and adjustment means are arranged in an end piece traversed by the rod integral with the piston and closing the said chamber at one end of the working cylinder, in an annular space situated between the rod of the piston and an outer casing of the shock absorber characterised in that said means comprise a rotative solenoid valve.

By virtue of this arrangement of the solenoid said passage and adjustment means are arranged in an end piece traversed by the rod integral with the piston and closing the said chamber at one end of the working cylinder, in an annular space situated between the rod of the piston and an outer casing of the shock absorber characterised in that said means comprise a rotative solenoid valve.

By virtue of this arrangement of the solenoid valve in an end piece of the shock absorber, the presence of this solenoid valve does not increase the bulkiness of the shock absorber. Furthermore, this solenoid valve modifies only the end piece and it is therefore possible to retain, in order to constitute the shock absorber in accordance with the invention, all the other parts of a conventional shock absorber. The useful stroke of the piston is not substantially reduced by the presence of the solenoid valve, the end piece incorporating this solenoid valve only very slightly exceeding the length of an end piece not provided with a solenoid valve.

In accordance with an essential feature of the shock absorber according to the invention, the adjustment means are constituted by a rotary solenoid valve comprising a stator fixedly mounted in said end piece, a rotor of magnetic material movable about the axis of the rod of the piston, at least one air gap situated between said stator and said rotor, and an electric coil, said stator, rotor, air gap and coil forming part of a magnetic circuit in which said electric coil causes a magnetic flux to circulate in such a manner as to selectively control the rotation of the rotor against the action of a return spring of this rotor towards a position of rest, and means integral with the rotor for the selective throttling of the passage means.

The rotary solenoid valve formed in this way is particularly suitable for installation in an annular space such as that delimited by the rod of the piston en one hand and the casing of the shock absorber on the other.

In accordance with another feature of the shock absorber according to the invention, the rotor and the stator define a plurality of air gaps which are distributed in a uniform and circular manner about the axis of the rod of the piston, each air gap being defined by a face of a magnetic pole projecting from the rotor and by a confronting face of a corresponding tooth formed on the stator, a stop of non-magnetic material being fixed in the stator so as to define the rest position of the rotor, which is loaded against this stop by the return spring.

A solenoid valve of this type thus comprises a conventional variable-air gap magnetic circuit in which the air gap tends to close in order to allow a maximum magnetic flux to pass in this air gap. The solenoid valve can thus, with a very short response time, ensure a large variation in the flow rates of the liquid circulating in the passage means by rotations of a small amplitude. It is insensitive to the accelerations to which the parts of the shock absorber parallel to the axis of the latter are subjected on account of the fact that the rotor turns in a plane perpendicular to this axis. This insensitivity is advantageous in a motor-vehicle suspension which is subjected to strong vertical accelerations when a wheel passes over an obstacle.

Figure 2:
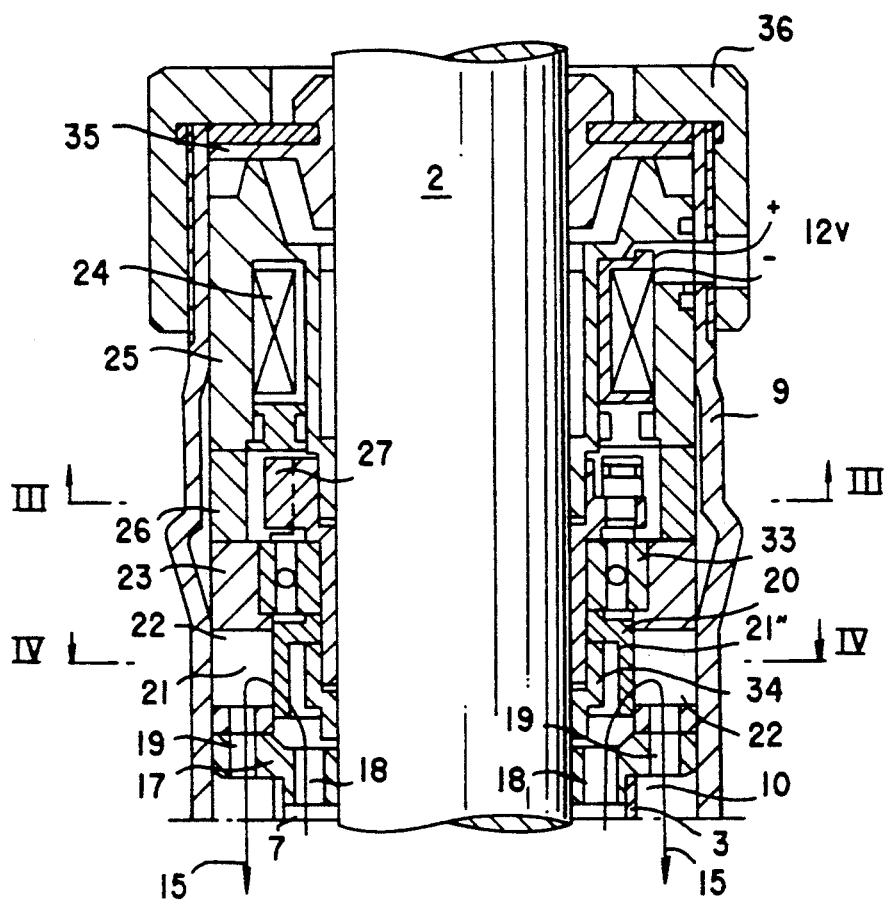
Figure 3:
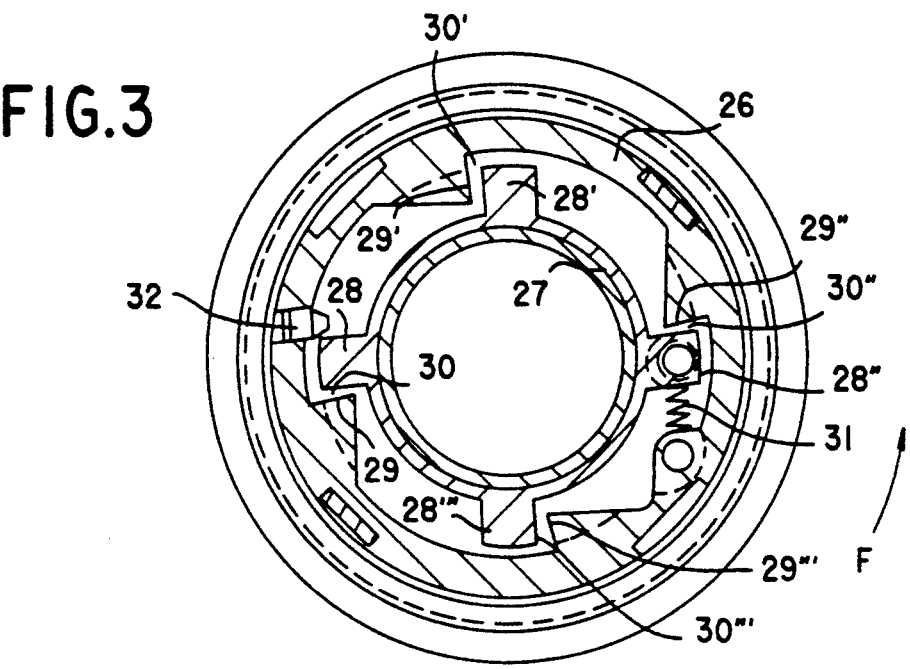
Figure 4:
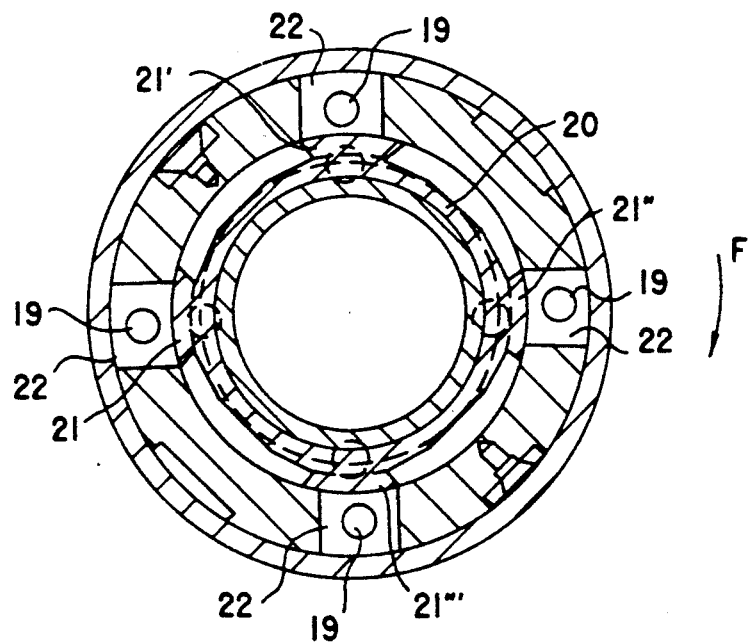

Other features and advantages of the shock absorber in accordance with the invention will emerge from reading the following description and on examination of the attached drawing, in which:

FIG. 1 is a view in axial section of a shock absorber equipped with a pilot solenoid valve in accordance with the invention, FIG. 2 is a view in axial section of this solenoid valve which shows its various constituent parts, FIG. 3 is a cross-sectional view of the solenoid valve of FIG. 2, along the line of section III—III of FIG. 2, and FIG. 4 is a cross-sectional view of the solenoid valve of FIG. 2, along the line of section IV—IV of this figure.

FIG. 1 shows a shock absorber in accordance with the invention of the "twin tube" type, which conventionally comprises a piston 1 integral with a rod 2 and capable of sliding in a working cylinder 3. The rod 2 is connected at its upper part to the chassis (not shown) of a motor vehicle, while the cylinder 3 is connected by means of a joining piece 4 to a support (not shown) of wheel of this vehicle. A suspension spring 5 is installed coaxially on the shock absorber, between a support 6 integral with the latter and the chassis of the vehicle. The piston 1 divides the cylinder into two chambers 7 and 8, which are the upper and lower chambers respectively, taking the view point of FIG. 1. A casing 9 which is concentric to the cylinder 3 defines around the latter a reservoir 10 for a damping liquid. This liquid fills the chambers 7 and 8. The chamber 8 communicates with the reservoir by virtue of a non-return valve 11 placed in the bottom of this chamber to permit the filling of the chamber 8 from the reservoir 10, in the direction of the arrow A, during the pressure-reducing phase (the piston then rising again, taking the view point of FIG. 1). A highly calibrated valve 13 provided in the piston 1 then also causes the chambers 7 and 8 to communicate during such a pressure-reducing phase, in order to make it possible for the liquid to circulate along the arrow C, shown to the left of the axis of the shock absorber in FIG. 1. The arrows B and D, shown to the right of this axis, correspond to the circulation of the liquid during the compression phase (the piston 1 then falling, taking the view point of FIG. 1). A non-return valve 14 is provided in the piston 1 in order to make it possible to put the chambers 7 and 8 in communication during the compression phase and to set up an identical pressure in these two chambers. A highly calibrated valve 11' placed at the bottom of the chamber 8 makes it possible for the liquid to circulate along the arrow B during the compression phase. All these arrangements are conventional and will not be described in more depth.

In accordance with the present invention, the shock absorber comprises additional means for the passage of the damping liquid, from the chamber 7 to the reservoir 10, in the direction of the arrows 15 shown in FIG. 1, and means for adjusting the flow rate of liquid in this passage, these passage and adjustment means being installed in an end piece 16 closing the working cylinder at its upper part and delimiting one end of the reservoir 10 which is adjacent to the end of the chamber 7 which communicates with the passage means. These means are shown in more detail in FIGS. 2 to 4. In FIG. 2, it is shown that a ring 17 bored with axial holes 18 and 19 leading out in the chamber 7 and in the reservoir 10, respectively, defines the means for the passage of the damping liquid between this chamber and the reservoir, in the direction of the arrows 15. The adjustment means are constituted by a circular hydraulic slide valve 20 mounted rotatably about the rod 2 of the piston 1 and provided with a series of closing devices 21, 21', 21'', 21''' which are distributed in a circular and uniform manner so as to close off progressively a series of holes 22 pierced radially in a bushing 23 so as to cause the axial holes 18 and 19 to communicate. Thus, depending on the angular position of the slide valve 20, the passage between the associated holes 18 and 19 is more or less obstructed by the closing device 21, 21', 21'', 21''' associated with the slide valve 20.

It will be noted that the passage of liquid thus defined, along the arrows 15, is in parallel with that established by the valves 13 and 11' installed in the piston 1 and the bottom of the chamber 8. The object of these valves, in the absence of solenoid valve control (or in the event of a breakdown of the solenoid valve), is to ensure "hard" operation of the shock absorber by allowing a circulation of liquid along the arrows B (during compression) or C (during pressure reduction), which circulation has a large pressure drop.

A detailed description will now be given of the means which serve to cause the slide valve 20 to rotate in order to adjust the flow rate or the pressure drop of the liquid circulating between the chamber 7 and the reservoir 10, through the passage means constituted by the series of holes 18, 22 and 19. These passage and adjustment means are incorporated in a rotary solenoid valve comprising an electric coil 24 and a magnetic circuit defined by a framework 25, an annular stator 26 coupled with this framework and a rotor 27 which is moved over the rod 2 of the piston I with clearance. The framework 25 encloses the coil and the magnetic circuit is closed by a series of air gaps defined between the stator 26 and the rotor 27. These components are conventionally made of one or more materials having low electromagnetic reluctance, the air gaps introducing into the circuit a section of high reluctance, which is proportional to their width. It will be noted, incidentally, that the framework 25 is shaped so as to interact with a sealing ring 35 and a cover 36 in such a manner as to close the end piece 16.

As shown in the cross-sectional view of FIG. 3, the rotor 27 takes the form of a ring from which there protrude, for example, four uniformly distributed poles 28, 28', 28", 28'''. Corresponding teeth 29, 29', 29", 29''' are formed on the inner surface of the stator 26, so as to define, with the poles, air gaps 30, 30', 30", 30''' which extend radially, relative to the axis of rotation of the rotor. A spring 31 loads the tooth 28 of the rotor 27 in a clockwise direction against a stop 32 made of a non-magnetic material. When the coil is not fed by an electrical energy source, the air gaps 30, 30', 30", 30''' thus have a maximum width. When the coil is fed, the magnetic flux traversing the magnetic circuit passes into the air gaps, causing the poles of the rotor to be attracted by the teeth of the stator, and therefore causing the rotor to rotate in the direction of the arrow F, against the action of the spring 31. It will be noted that, in accordance with an essential feature of the solenoid valve according to the invention, it is the radial orientation of the air gaps which makes possible the development of forces of attraction between the confronting faces of the air gaps, which comprise at least one tangential component making it possible for the rotor to rotate.

As shown in FIG. 2, the rotor 27 is mounted on the inner race of a rolling bearing 33, the outer race of which is accommodated in the bushing 23. The circular hydraulic slide valve 20 is mounted on the rotor 27 and made integral with the latter and with the inner ring of the bearing 33 by means of a nut 34 which clamps the said slide valve against this ring.

Thus, a rotation of the rotor 27, controlled by a suitable electrical supply to the coil 24, for example using an electrical energy source of +12 volts, such as the battery of a motor vehicle, makes it possible to rotate the slide valve 20 integral with this rotor by an angle controlled by the excitation of the coil, which opens the passages 18, 22, 19 for the liquid, between the chamber 7 and the reservoir 10 by moving the closing devices 21, 21', 21", 21''' away from the position shown in FIG. 4 by a rotation in the direction of the arrow F.

As soon as the excitation of the coil ceases, the return spring 31 brings the pole 28 of the rotor 27 against the stop 32 in the rest position shown in FIG. 3, this rotation at the same time replacing the slide valve 20 integral with the rotor in the position shown in FIG. 4 in which the closing devices 21, 21', 21", 21''' block the series of radial holes 22 again.

A shock absorber of the "twin tube" type has thus been formed which is provided with a rotary solenoid valve making it possible to control the damping obtained in accordance with one or more predetermined laws as a function of various parameters such as the pressure of the liquid in the shock absorber, the speed or the vertical acceleration of the piston, the speed of the vehicle, the angle of lock of the wheels, etc, both during the compression phase and the pressure-reducing phase. It will be noted that by a suitable adjustment of the excitation current of the coil 24, it is possible to vary the angle of rotation of the slide valve 20 and accordingly the pressure drop in the passages 18, 22, 19. Therefore, it is possible in this way to set up a continuous control of the flow rate of liquid in the passage. It would also be possible, of course, to provide an "all-or-nothing" control of the flow rate, with modulation of the cyclic ratio of the switching, without departing from the scope of the present invention.

It appears now that the shock absorber in accordance with the invention does indeed have the advantages mentioned. In particular, the rotary solenoid valve incorporated in this shock absorber has a compact annular structure which lends itself to installation in the casing 9 of the shock absorber, around the rod 2 of the piston, in place of an end piece which normally closes the "twin tube" 3, 9. The stroke of the piston 1 is not substantially reduced therefrom on account of the fact that the end piece with an incorporated rotary solenoid valve in accordance with the invention is only about 20 mm longer than that of a conventional end piece, in an illustrative embodiment of the invention.

The integration of the solenoid valve with the end piece makes it possible to retain, without modification, all the other essential components of the shock absorber, in particular the twin tube and the piston and the valves. This represents an economical solution in particular if a comparison is made between this structure and the structure of some shock absorbers where the solenoid valve is integrated with the piston rod, which solution additionally has the disadvantage of weakening the latter.

The rotary design of the solenoid valve makes it possible to obtain a large variation in the flow rate for a low angular travel, hence a high degree of dynamics in the law of adjustment. Since the rotor turns about the axis of the piston, its rotation is not influenced by the high axial accelerations to which the shock absorber of a vehicle travelling on an irregular road surface is subjected.

This solenoid valve, which employs a magnetic circuit with variable reluctance and has flat polar faces, has the same high rapidity as the electromagnets of similar design, and therefore a low response time.

Of course, the invention is not limited to the embodiment described and represented which has been given only by way of example. Thus, it would be possible to simplify the embodiment described by eliminating the valves 13 and 11' and by blocking the passages (B and C) which they control. The operation of the shock absorber then depends entirely on the flow rate of liquid adjusted by the solenoid valve, along the arrows 15. However, any breakdown of the latter would completely eliminate this flow rate and would block the shock absorber, the associated wheel then being deprived of suspension. It is apparent that the embodiment described and represented has a more satisfactory operation in that it does not eliminate the "suspension" function in "degraded" functioning mode.

The present invention is not limited to the use of a solenoid valve the stator and rotor of which are configurated as shown on FIG. 3. The poles of the rotor and the teeth of the stator could be shaped as rectangular crenels the poles of the rotor being freely movable in front of the teeth of the stator. Such a design permits to lengthen the stroke of the circular slide valve and therefore the damping liquid flow and the gain of the damping laws. This design also permits to make the intensity of the valve control electric current proportional to the angular position of the slide valve.

Furthermore, the solenoid valve, the bushing 23 and the bearing 33 could be enclosed in a cartridge manufactured independently of the working cylinder and comprising means for mounting the cartridge on such a cylinder, of conventional design. It is thus possible to change a conventional shock absorber into a shock absorber according to the present invention. By manufacturing the cartridge housing, the bushing and the bearing with non magnetizable materials, short-circuits of the magnetic field are minimized.

I claim:

1. A pilot-operated hydraulic shock absorber for a motor vehicle, comprising:
   a working cylinder having a cylinder axis, a piston rod and a piston coaxially disposed in said working cylinder; said
   piston defining in said working cylinder first and second chambers filled with a damping fluid;
   an outer fluid reservoir communicatingly connected to said working cylinder, passage means for allowing said outer fluid reservoir to fluidically communicate with said first chamber;
   an end piece disposed at an end of said working cylinder and closing said first chamber opposite said piston;
   said passage means being disposed in said end piece and including a solenoid-operated rotary valve disposed concentrically around said piston rod, said rotary valve being comprised of:
   a stator fixedly mounted in said end piece;
   a rotor disposed in said end piece and being rotatable about said cylinder axis; said rotor including adjustment means for selectively throttling said passage means and adjusting a pressure drop in the fluid across said passage means; said adjustment means including projections integrally formed on said rotor for selectively closing and opening said passage means fluidically connecting said first chamber and said outer fluid reservoir;
   said rotor and said stator defining at least one air gap therebetween;
   means in the form of an electric coil for establishing a magnetic field in said end piece;
   means for rotatingly biasing said rotor in a given direction;
   said stator, said rotor, said at least one air gap, and said coil forming a part of an electro-magnetic circuit in which the magnetic field established by said electric coil causes selective rotation of said rotor in a direction opposite said given direction and against said biasing means for selectively throttling said passage means.

2. The shock absorber according to claim 1, wherein said outer fluid reservoir is an annular reservoir disposed concentrically about said working cylinder, said annular reservoir being defined by an outer casing and said working cylinder and being closed on one end by said end piece, said passage means being channels formed in said end piece.

3. The shock absorber according to claim 1, wherein said at least one air gap is a plurality of air gaps uniformly distributed circularly about said cylinder axis, each of said plurality of air gaps being defined between a face of a magnetic pole projecting from said rotor and an associated tooth projecting from said stator, and including a stop of non-magnetic material disposed in said stator for stopping said rotor in a rest position against a biasing force of said biasing means.

4. The shock absorber according to claim 1, including a roller bearing disposed around and clamping said rotor, a bushing integrally formed around said roller bearing and being clamped within a casing of the shock absorber, said piston rod being movable within said rotor with clearance.

5. The shock absorber according to claim 1, including an annular framework of magnetic material disposed around said electric coil of said solenoid-operated valve, a sealing ring and a cover disposed on said sealing ring and attached to an outer casing of the shock absorber.

6. A pilot-operated hydraulic shock absorber for a motor vehicle, comprising:
   a working cylinder having a cylinder axis, a piston rod and a piston coaxially disposed in said working cylinder; said piston defining in said working cylinder first and second chambers filled with a damping fluid;
   an outer fluid reservoir communicatingly connected to said working cylinder, passage means for allowing said outer fluid reservoir to fluidically communicate with said first chamber;
   an end piece disposed at an end of said working cylinder and closing said first chamber opposite said piston;
   said passage means being disposed in said end piece and including a solenoid-operated rotary valve disposed concentrically around said piston rod, said rotary valve being comprised of:
   a stator fixedly mounted in said end piece;
   a rotor disposed in said end piece and being rotatable about said cylinder axis; said rotor including adjustment means for selectively throttling said passage means and adjusting a pressure drop in the fluid across said passage means;
   said rotor and said stator defining at least one air gap therebetween;
   means in the form of an electric coil for establishing a magnetic field in said end piece;
   means for rotatingly biasing said rotor in a given direction;
   said stator, said rotor, said at least one air gap, and said coil forming a part of an electro-magnetic circuit in which the magnetic field established by said electric coil causes selective rotation of said rotor in a direction opposite said given direction and against said biasing means for selectively throttling said passage means;
   an annular member disposed around and surrounding said adjustment means, said annular member having at least one radial opening formed therein, said at least one opening being a part of said passage means, said adjustment means for throttling said passage means including a circular rotary hydraulic slide valve disposed on said rotor and having at least one closing device for sliding over said at least one radial opening, for selectively closing and progressively opening said radial opening as a function of an angle of rotation of said rotor.

7. The shock absorber according to claim 6, wherein said at least one opening is a given number of openings formed in said annular member uniformly distributed circularly about said cylinder axis, and said at least one closing device of said rotary slide valve is a given number of closing devices each associated with one of said given number of openings.

8. The shock absorber according to claim 6, wherein said outer fluid reservoir is an annular reservoir disposed concentrically about said working cylinder, said annular reservoir being defined by an outer casing and said working cylinder and being closed on one end by said end piece, said passage means being channels formed in said end piece.

9. The shock absorber according to claim 6, wherein said at least one air gap is a plurality of air gaps uniformly distributed circularly about said cylinder axis, each of said plurality of air gaps being defined between a face of a magnetic pole projecting from said rotor and an associated tooth projecting from said stator, and including a stop of non-magnetic material disposed in said stator for stopping said rotor in a rest position against a biasing force of said biasing means.

10. The shock absorber according to claim 6, including a roller bearing disposed around and clamping said rotor, a bushing integrally formed around said roller bearing and being clamped within a casing of the shock absorber, said piston rod being movable within said rotor with clearance.

11. The shock absorber according to claim 6, including a annular framework of magnetic material disposed around said electric coil of said solenoid-operated valve, a sealing ring and a cover disposed on said sealing ring and attached to an outer casing of the shock absorber.

* * * * *